United States Patent
Lesjak

(10) Patent No.: US 7,275,007 B2
(45) Date of Patent: Sep. 25, 2007

(54) METHOD FOR ZERO CORRECTION OF A MEASURING DEVICE

(75) Inventor: Ralf Lesjak, Rosdorf (DE)

(73) Assignee: ABB Patent GmbH, Ladenburg (DE)

( * ) Notice: Subject to any disclaimer, the term of this patent is extended or adjusted under 35 U.S.C. 154(b) by 0 days.

(21) Appl. No.: 10/972,713

(22) Filed: Oct. 26, 2004

(65) Prior Publication Data

US 2005/0119845 A1    Jun. 2, 2005

(30) Foreign Application Priority Data

Oct. 31, 2003    (DE) ............................... 103 51 313

(51) Int. Cl.
  *G06F 19/00*    (2006.01)
  *G01F 25/00*    (2006.01)
(52) U.S. Cl. .......................... 702/87; 73/1.34
(58) Field of Classification Search .............. 702/87, 702/100; 73/1.34, 1.16, 1.88, 861, 861.354, 73/861.355; 137/8

See application file for complete search history.

(56) References Cited

U.S. PATENT DOCUMENTS

| | | | | |
|---|---|---|---|---|
| 5,228,327 A * | 7/1993 | Bruck | ......................... | 73/1.34 |
| 5,311,762 A * | 5/1994 | Drexel | ........................ | 73/1.34 |
| 5,542,286 A * | 8/1996 | Wang et al. | ............... | 73/23.22 |
| 5,594,180 A * | 1/1997 | Carpenter et al. | ..... | 73/861.356 |
| 5,641,914 A * | 6/1997 | Doll | ........................ | 73/861.17 |
| 5,796,010 A * | 8/1998 | Kishiro et al. | ......... | 73/861.357 |
| 5,869,770 A * | 2/1999 | Yoshimura et al. | ........... | 73/861 |
| 5,926,096 A * | 7/1999 | Mattar et al. | ................ | 340/606 |
| 5,969,265 A * | 10/1999 | VanCleve et al. | ...... | 73/861.357 |
| 5,983,700 A * | 11/1999 | Yamaguchi et al. | ......... | 73/1.34 |
| 6,092,409 A * | 7/2000 | Patten et al. | .................. | 73/1.34 |
| 6,185,983 B1 * | 2/2001 | Soderholm et al. | .......... | 73/1.34 |
| 6,237,394 B1 * | 5/2001 | Harris et al. | .................. | 73/1.88 |
| 6,332,366 B1 * | 12/2001 | Wray | ..................... | 73/861.356 |
| 6,430,985 B1 * | 8/2002 | Drees | .......................... | 73/1.34 |
| 6,782,764 B2 * | 8/2004 | Osawa | .................. | 73/861.355 |
| 6,834,557 B2 * | 12/2004 | Matt | ..................... | 73/861.357 |
| 6,904,379 B1 * | 6/2005 | Hanzawa et al. | ........... | 702/106 |
| 6,981,424 B2 * | 1/2006 | Henry et al. | ........... | 73/861.356 |
| 6,997,032 B2 * | 2/2006 | Mattar | ........................ | 73/1.34 |

OTHER PUBLICATIONS

Storm et al., Model-Based Correction of Coriolis Mass Flowmeters, Aug. 2002, IEEE Transactions on Instrumentation and Measurement, vol. 51, No. 4, pp. 605-610.*
Hylton et al., An Instrument for Gravimetric Calibration of Flow Devices With Corrosive Gases, Jun. 27-30, 1999, 4th International Symposium on Fluid Flow Measurement.*
Storm et al., Model-Based Correction of Coriolis Mass Flowmeters, Aug. 2002, IEEE Transactions on Instrumentation and Measurement, vol. 51, No. 4, pp. 605-610.*
Henry, M., Self-Validating Digital Coriolis Mass Flow Meter, Oct. 2000, Computing & Control Engineering Journal, pp. 219-227.*
Liu et al., A Neural Network to Correct Mass Flow Errors Caused by Two-Phase Flow in a Digital Coriolis Mass Flowmeter, 2001, Flow Measurement and Instrumentation 12, pp. 53-63.*

* cited by examiner

*Primary Examiner*—Donald E. McElheny, Jr.
*Assistant Examiner*—Toan M. Le
(74) *Attorney, Agent, or Firm*—Buchanan Ingersoll & Rooney PC

(57) ABSTRACT

Method for zero correction of a measuring device, in particular a flowmeter, wherein a number of zero settings are carried out with the device and/or process in different states. In the case of each of these zero settings, a set of device and/or system parameters is recorded together with the measured zero value and stored in an electronic memory, and in normal operation of the measuring device, a stored set of device and/or system parameters that matches the respectively current system and/or device parameters is sought, so that the measured zero value assigned to this set of parameters is used as the current zero value.

20 Claims, No Drawings

METHOD FOR ZERO CORRECTION OF A MEASURING DEVICE

The invention relates to a method for zero correction of a measuring device, in particular a flowmeter, such as for example a mass flowmeter based on the Coriolis principle.

A known method for zero correction is to use a system zero adjustment to zeroize the flow indication of the device installed in the system and filled with medium at rest.

In this adjustment, the momentary flow indication, i.e. when filled with medium at rest, is stored and in the future is subtracted from the current measured value which is then determined with medium flowing. This is intended to ensure as far as possible that the device does not indicate any flow when the medium is stationary under the ambient conditions and installation conditions prevailing at the particular moment.

Depending on the physical measuring principle, the system zero of a flowmeter is dependent on various process conditions.

Installation Conditions:
  mechanical moments and forces
  pressure conditions
  mechanical disturbances
  hydraulic disturbances
  electromagnetic disturbances Ambient Conditions:
  pressure of the medium in the measuring pickup
  ambient temperature
  temperature of the medium
  viscosity of the medium
  conductivity of the medium
  damping properties of the medium
  gas components in the medium If one or more parameters changes, there may be a zero shift, which as an additional deviation reduces the accuracy of the flow measurement.

A zero deviation has a greater effect at smaller flows, which can be described by the following formula:

$$Q' = Q + NP$$

$$dev = \left(\frac{Q+NP}{Q} - 1\right) \cdot 100\%$$

where
Q' is the indicated flow
Q is the true flow
NP is the zero offset caused by changed installation or ambient conditions
dev is the additional percentage deviation of the flow indication caused by the zero deviation.

An example should illustrate the situation:

The momentary flow is Q=100% of the maximum flow range. The zero shift caused by changed process conditions NP=0.01%

$$dev = \left(\frac{Q+NP}{Q} - 1\right) \cdot 100\%$$
$$= \left(\frac{100\% + 0.01\%}{100\%} - 1\right) \cdot 100\%$$
$$= 0.01\%$$

This gives an additional deviation of +0.01%.

However, a reduced flow of 2% of the maximum flow range already gives an additional deviation of 0.5%.

$$dev = \left(\frac{Q+NP}{Q} - 1\right) \cdot 100\%$$
$$= \left(\frac{2\% + 0.01\%}{100\%} - 1\right) \cdot 100\%$$
$$= 0.5\%$$

The object of the present invention is to provide an improved method for zero correction.

In the case of the method according to the invention, zero settings are carried out with the device and/or process in a number of different states. In the case of each of these zero settings, a set of device and/or system parameters is recorded together with the measured zero value and stored in an electronic memory. In normal operation of the measuring device, a stored set of device and/or system parameters that matches the respectively current system and/or device parameters is then sought, so that the measured zero value assigned to this set of parameters is used as the current zero value. If none of the current sets of parameters exactly matches one of the stored sets of parameters, two nearest sets of device and/or system parameters that are stored in the memory are sought for a current set of device and/or system parameters and the current zero value is determined by interpolation from the measured zero values assigned to these nearest sets of parameters.

The zero setting uses the possibility of storing all available process values for a number of different operating states and performing an interpolated zero correction for operating states between these values. In other words, the zero correction is learnable, all the better the more zero adjustments are made.

This is to be illustrated by a mass flowmeter based on the Coriolis principle.

The device measures the mass flow, the density of the medium and the temperature of the medium. The current of the driver and the temperature of the housing may also be measured for example as internal measured variables.

Every time a zero setting is carried out, all the parameters determined by measuring instruments are stored in a matrix. Each time the automatic system zero adjustment is carried out, a new set of data is added, so that the amount of data in the array is increased. If the array is filled with n elements, the last element (with the oldest data) can be removed when there is a renewed call for a system zero.

If the device is exactly in an operating state which is stored in the array, the associated, stored system zero can be used directly for compensation.

If this is not the case however (quite common in practical operation), the correction value is to be determined with the aid of the data of the array. This may take place in various ways.
  weighting of the individual columns according to parameters with subsequent interpolation
  fuzzy logic
  neural network

| System Zero Adjust Z [% measured end value] | Parameter 1 Temperature of medium (pipe temperature) Tp [° C.] | Parameter 2 Housing temperature Th [° C.] | Parameter 3 Density D [kg/dm3] | Parameter 4 Driver current Id [mA] | Parameter 6 Time stamp [ms] |
|---|---|---|---|---|---|
| Z1 | Tp1 | Th1 | D1 | Id1 | t1 |
| Z2 | Tp2 | Th2 | D2 | Id2 | t2 |
| Z3 | Tp3 | Th3 | D3 | Id3 | t3 |
| . | . | . | . | . | . |
| . | . | . | . | . | . |
| . | . | . | . | . | . |
| Zn | Tpn | Thn | Dn | Idn | tn |

Further parameters are possible (for example force, pressure).

An example for illustration:

To simplify matters, only parameter 1 (temperature of the medium) is considered. When the device is installed in the installation and filled with medium, a system zero adjustment must be carried out. The system zero adjustment is started manually and brings about the effect that the software averages the zero point over a certain time. 0.01% is obtained for example as zero point Z1.

Cold water at 4° C. is in the pipe as medium. Consequently, Z1=0.01% and Tp1=4° C. are stored as dataset 1. If the temperature of the medium is now changed for example to 80° C., a zero shift to 0.02% is obtained. In other words the device measures incorrectly by an amount of 0.01% from the end value without renewed zero correction.

The renewed system zero correction produces as the stored dataset Z2=0.02% and Tp1=80° C.

Consequently, in the operating state with warm water at 80° C. the zero point is corrected with Z2 and in the operating state with cold water at 4° C. it is corrected with Z1. At other temperatures, a zero correction value is interpolated according to the algorithm used (for example linear interpolation or fuzzy logic).

The device consequently shows much improved operating characteristics under different process conditions.

A further particular advantage is the self-learning capability of the method. For example, a measuring device can be delivered and installed in the process with only one preset zero value.

Whenever the operator carries out a zero correction, the corresponding zero point values are determined and automatically added to the matrix. Therefore, the corresponding set of device and/or system parameters with the assigned new zero point is automatically added in the memory matrix. Over time, the memory matrix is filled and contains specifically for the installation site the corresponding assignment of sets of parameters and zero points, and is constantly adapted automatically to the changing conditions. The duration of a zero measurement can be advantageously handled variably and controlled intelligently. This is so because it is known that the zero determination takes place all the more accurately the longer the measuring time during the zero point recording. In the case of uncritical system processes, this measuring time is therefore kept relatively short, in the case of critical or difficult processes it is chosen to be correspondingly longer. The system can then learn itself from the history of the recorded zero determinations and develop criteria concerning how long the ideal duration of zero point recording should be. If, for example, in the case of the past zero determinations the zero point has changed frequently, this is an indication that it is likely to be a critical process.

In this case, the system would then choose a longer zero determination time for future zero adjustments. The corresponding historical evaluation can be carried out automatically on the basis of the device and/or system parameters stored in the matrix, with the associated ordered zero points. If in the past the zero point has changed relatively little or has remained relatively constant in previous zero determinations, the system can conclude from this that it is installed in what is likely to be an uncritical process, and in future zero determinations the system will accordingly tend to set the time duration for zero determination to be shorter.

The invention claimed is:

1. Method for zero correction of a measuring device, in particular a flowmeter, wherein a number of zero settings are carried out with the device and/or process in different states, each zero setting correlating a zero value to a corresponding set of device and/or system parameters and storing the zero value and the corresponding set of device and/or system parameters in an electronic memory, whereby at least one zero setting is carried out prior to or during installation of the measuring device, and whereby at least one further zero setting is carried out as zero adjustment/correction routine during operation, wherein for a zero adjustment/correction routine during operation, the zero value and the corresponding set of device and/or system parameters are automatically added to the memory, wherein in normal operation of the measuring device, a stored set of device and/or system parameters that matches the respectively current system and/or device parameters is sought, so that the measured zero value assigned to this set of parameters is used as the current zero value, and wherein two nearest sets of device and/or system parameters that are stored in the memory are sought for a current set of device and/or system parameters and the current zero value is determined by interpolation from the measured zero values assigned to these nearest sets of parameters.

2. Method according to claim 1, wherein each time the zero adjustment/correction routine is carried out, a Previously Presented set of data is added to the memory, so that the amount of data in the memory is increased, and wherein, if the memory is filled with n data sets, the oldest data set is removed when there is a renewed adjustment/correction routine carried out.

3. Method according to claim 2, wherein during normal device operation the frequency of occurrence of zero adjustment/correction routines is recorded, and derived from this is a criteria about process-criticality.

4. Method according to claim 2, wherein the duration of each zero adjustment/correction routine is determined automatically in the measuring device and adapted accordingly based on specified criteria of process-criticality.

5. Method according to claim 4, wherein the criteria of process-criticality are developed in a self-learning way within the measuring device based on device and/or system parameters and/or frequency of occurrence of zero adjustment/correction routines.

6. Method according to claim 4, wherein one zero setting is carried out prior to or during installation of the measuring device, and whereby all further zero settings are carried out as zero adjustment/correction routines during operation.

7. Method according to claim 6, wherein the device and/or system parameters are determined by measuring instruments.

8. A computer readable medium comprising a computer program to carry out the method of claim 1, wherein the steps of the method are stored within the computer program stored within the computer readable medium.

9. A flowmeter of the vibration type, comprising a flowtube, at least one sensor coupled to the flowtube, the sensor being operable to measure a parameter of the tube vibration, at least a further sensor, the further sensor being operable to measure at least one further device/system parameter, a processing device coupled to the sensors, the processing device being configured to:
carry out a number of zero settings with the device and/or process in different states, each zero setting correlating a zero value to a corresponding set of device and/or system parameters and storing the zero value and the corresponding set of device and/or system parameters in an electronic memory;
whereby at least one zero setting is carried out prior to or during installation of the measuring device, and whereby at least one further zero setting is carried out as zero adjustment/correction routine during operation;
wherein for a zero adjustment/correction routine during operation, the zero value and the corresponding set of device and/or system parameters are automatically added to the memory, and
wherein in normal operation of the measuring device, a stored set of device and/or system parameters that matches the respectively current system and/or device parameters is sought, so that the measured zero value assigned to this set of parameters is used as the current zero value.

10. The flowmeter of claim 9, wherein two nearest sets of device and/or system parameters that are stored in the memory are sought for a current set of device and/or system parameters and the current zero value is determined by interpolation from the measured zero values assigned to these nearest sets of parameters.

11. The flowmeter of claim 10, wherein each time the zero adjustment/correction routine is carried out, a Previously Presented set of data is added to the memory, so that the amount of data in the memory is increased, and wherein, if the memory is filled with n data sets, the oldest data set is removed when there is a renewed adjustment/correction routine carried out.

12. The flowmeter of claim 11, wherein the duration of each zero adjustment/correction routine is determined automatically in the measuring device and adapted accordingly based on specified criteria of process-criticality.

13. The flowmeter of claim 12, wherein the criteria of process-criticality are developed in a self-learning way within the measuring device based on device and/or system parameters and/or frequency of occurrence of zero adjustment/correction routines.

14. The flowmeter of claim 13, wherein one zero setting is carried out prior to or during installation of the measuring device, and whereby all further zero settings are carried out as zero adjustment/correction routines during operation.

15. A transmitter for use with a flowmeter of the vibration type, that includes a flowtube, at least one sensor coupled to the flowtube, the sensor being operable to measure a parameter of the tube vibration, at least a further sensor, the further sensor being operable to measure at least one further device/system parameter, the transmitter comprising a processing device coupled to the sensors, the processing device being configured to:
carry out a number of zero settings with the device and/or process in different states, each zero setting correlating a zero value to a corresponding set of device and/or system parameters and storing the zero value and the corresponding set of device and/or system parameters in an electronic memory;
whereby at least one zero setting is carried out prior to or during installation of the measuring device, and whereby at least one further zero setting is carried out as zero adjustment/correction routine during operation;
wherein for a zero adjustment/correction routine during operation, the zero value and the corresponding set of device and/or system parameters are automatically added to the memory, and
wherein in normal operation of the measuring device, a stored set of device and/or system parameters that matches the respectively current system and/or device parameters is sought, so that the measured zero value assigned to this set of parameters is used as the current zero value.

16. The transmitter of claim 15, wherein two nearest sets of device and/or system parameters that are stored in the memory are sought for a current set of device and/or system parameters and the current zero value is determined by interpolation from the measured zero values assigned to these nearest sets of parameters.

17. The transmitter of claim 16, wherein each time the zero adjustment/correction routine is carried out, a Previously Presented set of data is added to the memory, so that the amount of data in the memory is increased, and wherein, if the memory is filled with n data sets, the oldest data set is removed when there is a renewed adjustment/correction routine carried out.

18. The transmitter of claim 17, wherein the duration of each zero adjustment/correction routine is determined automatically in the measuring device and adapted accordingly based on specified criteria of process-criticality.

19. The transmitter of claim 18, wherein the criteria of process-criticality are developed in a self-learning way within the measuring device based on device and/or system parameters and/or frequency of occurrence of zero adjustment/correction routines.

20. The transmitter of claim 19, wherein one zero setting is carried out prior to or during installation of the measuring device, and whereby all further zero settings are carried out as zero adjustment/correction routines during operation.

* * * * *